United States Patent
Sugai

[19]

[11] Patent Number: 6,117,576
[45] Date of Patent: Sep. 12, 2000

[54] BATTERY DEVICE

[75] Inventor: Kenji Sugai, Kyoto, Japan

[73] Assignee: Rohm Co., Ltd., Kyoto, Japan

[21] Appl. No.: 09/171,746

[22] PCT Filed: Feb. 18, 1998

[86] PCT No.: PCT/JP98/00697

§ 371 Date: Oct. 23, 1998

§ 102(e) Date: Oct. 23, 1998

[87] PCT Pub. No.: WO98/38689

PCT Pub. Date: Sep. 3, 1998

[30]  Foreign Application Priority Data

Feb. 26, 1997 [JP] Japan .................................. 9-041757

[51] Int. Cl.$^7$ ........................... H01M 14/00; H01M 2/00; H01M 10/46
[52] U.S. Cl. ............................... 429/7; 429/163; 429/96; 429/100
[58] Field of Search ..................... 429/163, 164, 429/176, 178, 179, 96, 100, 7, 122

[56]  References Cited

U.S. PATENT DOCUMENTS 5,472,804  12/1995  Austin et al. ............................. 429/99

FOREIGN PATENT DOCUMENTS

| 60-9300 | 1/1985 | Japan . |
| 1-177869 | 7/1989 | Japan . |
| 3-15175 | 1/1991 | Japan . |
| 6-325796 | 11/1994 | Japan . |
| H7-134984 | 5/1995 | Japan . |
| H7-220754 | 8/1995 | Japan . |

*Primary Examiner*—Maria Nuzzolillo
*Assistant Examiner*—Angela J. Martin
*Attorney, Agent, or Firm*—Hoffman & Baron, LLP

[57]  ABSTRACT

A battery device includes a lithium ion battery in a flattened cylindrical form and a circuit board arranged on a side surface of the battery. A first connection member connects between the circuit board and a positive pole, while a second connection member connects between the circuit board and a negative pole. The first connection member and the second connection member are both of strip members. The strip member is formed is a plurality of partial cuts extending from a lateral end of the strip member in a width direction. When there is a variation in the connection length between the circuit board and the positive/negative pole, the plurality of the partial cuts are opened or closed to thereby absorb the variation of the connection length by the first connection member and the second connection member.

10 Claims, 6 Drawing Sheets

BATTERY DEVICE

TECHNICAL FIELD

The present invention relates to battery devices. More particularly, the invention relates to a battery device including a lithium ion battery and a protection circuit board.

PRIOR ARTS

There is a demand toward reducing the size and weight of power batteries due to recent size and weight reductions in electronic appliances, including handy phones. In order to meet such a demand, a secondary battery (may be hereinafter called merely "lithium ion battery") has been developed that utilizes for its negative pole a material capable of being doped with and/or de-doped of lithium or lithium ions. This lithium ion battery, which is high in power voltage and light in weight with suppressed self-discharge characteristics, has being placed into practical applications.

The secondary battery of this kind, however, has a characteristic that its electrode member experiences repeated expansion and contraction during charge and discharge of electricity. Under such a situation, various considerations have been made so far, as to how is solved the technical problem caused by expansion and contraction in the electrode material.

For example, there is a proposal in Japanese Patent Laying-open No. H7-134984 [H01M 4/02, 4/58, 10/40] laid open to public on May 23, 1996, wherein a cylindrical secondary battery is structured by an electrode body in a spiral form so that the pressure exerted between the positive and negative electrodes are moderated even where thermal expansion in volume is caused in the electrode material to a full extent. Meanwhile, Japanese Patent Laying-open No. H7-220754 [10/38, 10/38] laid open to public on Aug. 18, 1996 proposes that an electrode body is structured by a layered body bundled by a thermally-contractable tube to absorb volumetric expansion caused upon electricity charging and discharging, thereby preventing the layered body from being deformed. The latter prior art further includes a resilient ring between the vessel and the lid or a corrugated portion in the vessel itself so that the electrode body is allowed to expand and contract, thus maintaining the form of the layered body.

In this manner, various proposals have been made in order to maintain the electrode body structure in a manner free from effects of expansion and contraction of the electrode body.

Meanwhile, the lithium ion batteries as above often have a protection circuit to suppress the battery from going into overworking. Such a protection circuit is usually arranged directly on the battery as shown in FIG. 1 due to the requirement to reduce the size and weight of the above-mentioned electronic appliances, thus achieving space savings.

There is shown in FIG. 1 a prior art battery device 1, which includes a lithium ion battery 12 having a layered body (not shown) in a flattened cylindrical form. This lithium ion battery 12 has a positive pole lead 14 exposed in a top surface and a negative pole lead 16 exposed in a bottom surface. A circuit board 20 built with a protection circuit 18 is arranged in contact with a side surface of the battery 12. The circuit board 20 has connection strips 2 and 4 electrically connected to the protection circuit 18. These connection strips 2 and 4 are formed, for example, by nickel thin sheets and electrically connected respectively to the positive pole lead 14 and the negative pole lead 16.

In the battery device 1 of FIG. 1, the use of the lithium ion battery 1 results in repeated expansion and contraction in the layered body (not shown), as stated before. There is, however, no expansion and contraction in the circuit board 20 and the connection strips 2 and 4. As a result, stresses are applied to these parts. If such stresses be applied to structurally weak portions, such as the points fixing connection strips 2 and 4 on the circuit board 20, or to the circuit board 20 itself, there may be cases that cracks occur in circuit parts such as the protection circuit 18 or the circuit board 20.

Under such situations, conventionally various improvements have been tried in order to increase the strength against the above stresses. The conventional improvement proposals, however, involve the use of special-design parts or rigidity-increased parts enhancing the total strength. This, however, results in a problem that the battery device is hindered against size and weight reduction with mount-up of manufacture cost.

SUMMARY OF THE INVENTION

It is therefore a primary object of the present invention to provide, with reduced cost, a battery device which is enhanced in resistance to stresses to be caused thereon.

It is another object of the present invention to provide a battery device which has increased resistance to stresses while made in small size and light weight.

A battery device according to the present invention, comprises: a lithium ion battery having a positive pole and a negative pole formed of a polymer material to effect electricity charge and discharge due to lithium ions; a circuit board arranged on an outer surface of the lithium ion battery; a first connection member which connects between the circuit board and the positive pole; a second connection member which connects between the circuit board and the negative pole; and a length varying means provided in association with at least one of the first connection member and the second connection member to vary at least one of a first connection length between the circuit board and the positive pole and a second connection length between the circuit board and the negative pole.

Even if there is a variation in the connection length between at least one of the positive and negative poles of the lithium ion battery and the circuit board due to expansion or contraction caused by charging or discharging the lithium ion battery, the variation in the connection length is absorbed by the length varying means provided in association with the first connection member/second connection member.

Accordingly, in this invention the length varying means provided in association with at least one of the first connection member and the second connection member enables the connection member to be relieved of stresses acting thereon. This eliminates the necessity of using specially-designed parts or increasing the part rigidity, thus reducing cost without hindering against size and weight reductions in the battery device.

In one aspect of the present invention, the length varying means includes an expandable/contractible portion formed in at least one of the first connection member and the second connection member. This expandable/contractible portion includes a easily deformable portion. It can be considered that the easily deformable portion is formed by a plurality of partial cuts or a curved portion formed in at least one of the first connection member and the second connection member.

The above described objects and other objects, features, aspects and advantages of the present invention will become more apparent from the following detailed description of the present invention when taken in conjunction with the accompanying drawings.

BEST FORMS FOR EMBODYING THE INVENTION

Figure 1:
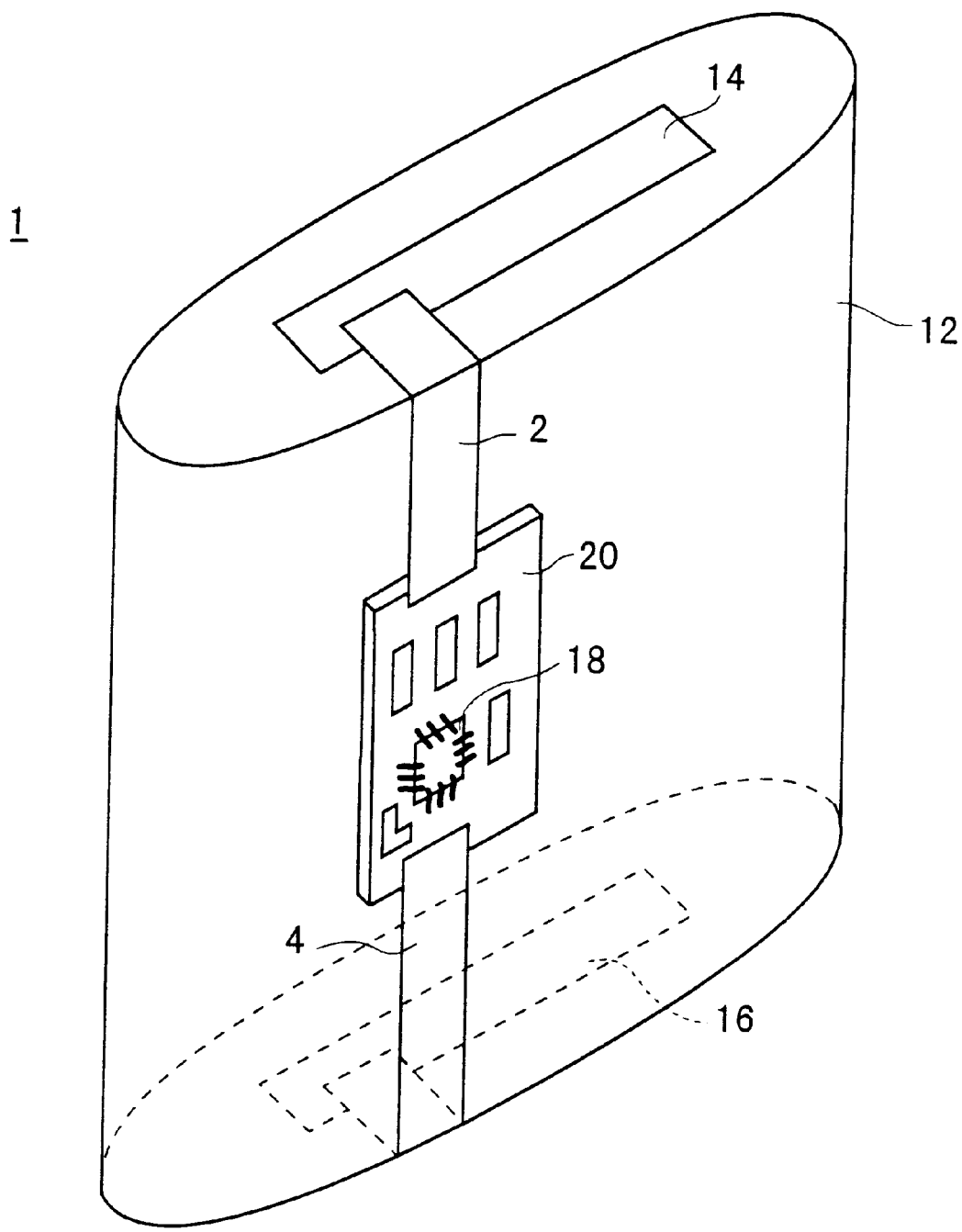
FIG. 1 is an illustrative view showing a conventional battery structure.
Figure 2:
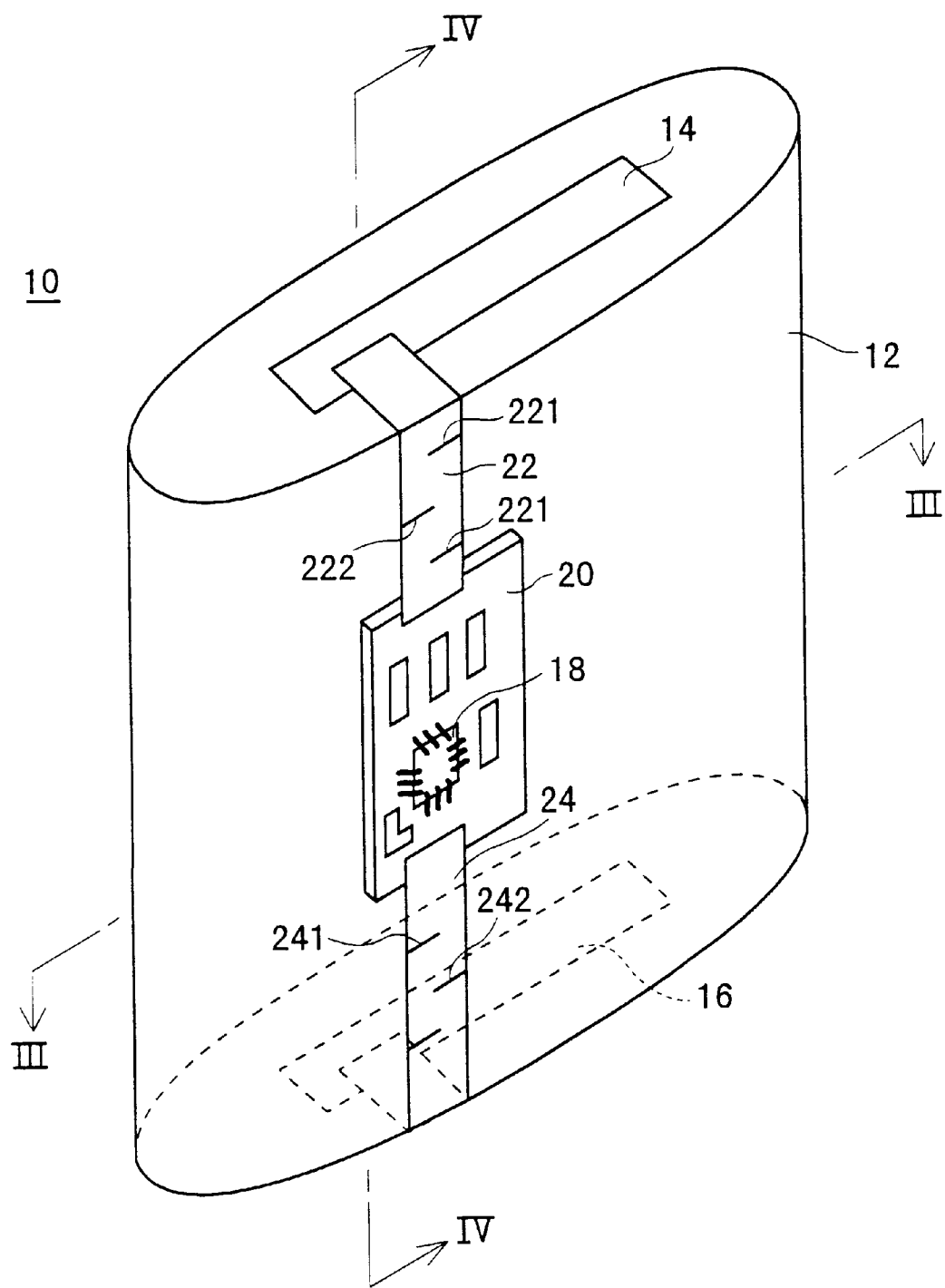
FIG. 2 is an illustrative view showing a battery structure according to one embodiment of the present invention.
Figure 3:
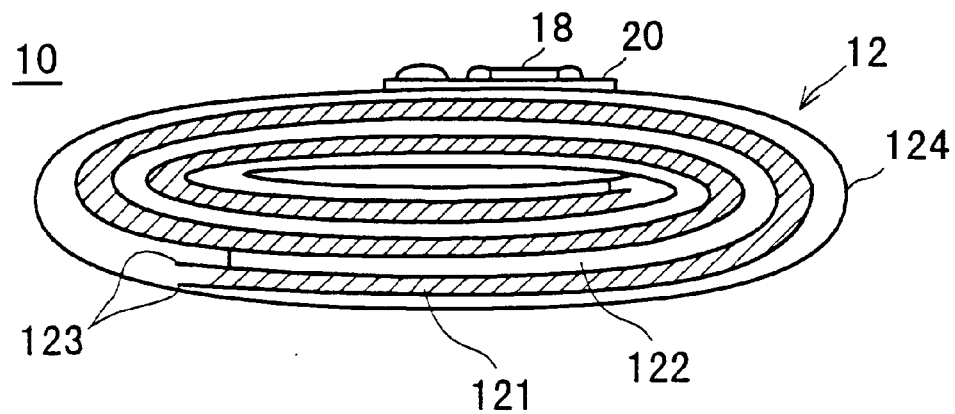
FIG. 3 is a sectional view taken along the line III—III in FIG. 2.
Figure 4:
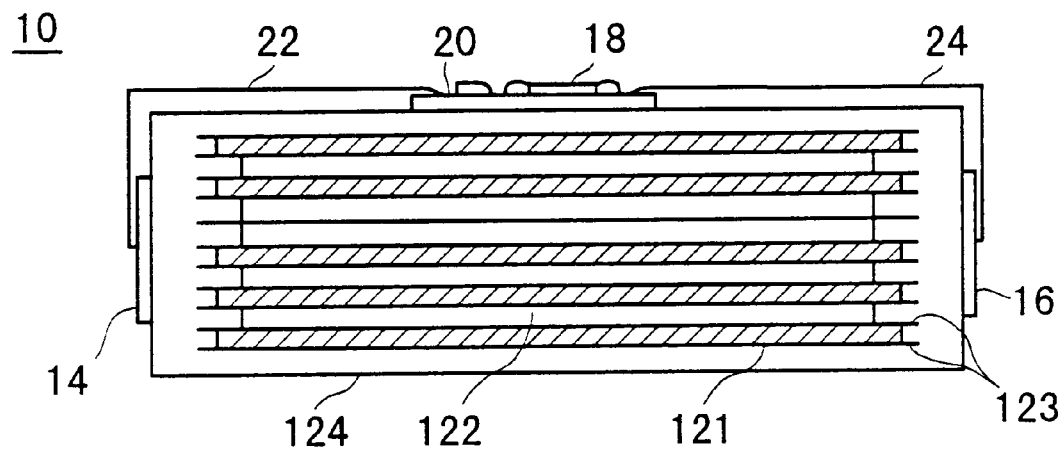
FIG. 4 is a sectional view taken along the line IV—IV in FIG. 2.

There is illustrated in FIG. 2 a battery device 10 according to an embodiment of the present invention. The battery device 10 includes a lithium ion battery 12 structured as shown in FIG. 3 and FIG. 4. The lithium ion battery 12 has a structure basically similar to that described, for example, in Japanese Patent Laying-Open No. H7-134984 mentioned before. That is, the lithium ion battery 12 has a negative pole 121 formed by applying a negative-pole compound mixture based on a carbon-containing material to opposite surfaces of a strip-formed copper foil and then curing the same, a positive pole 122 formed by applying a positive-pole compound mixture based on $LiCoO_2$ to opposite surfaces of a strip-formed aluminum foil and then curing the same, and a separator formed by a polypropylene film with fine pores. These negative pole 121, the separator 123, the positive pole 122 and the separator 123 are layered in this order, and spirally wound into a flattened cylindrical form. This layered body is provided at its top surface with a positive-pole lead 14 and at its back surface with a negative-pole lead 16, which are respectively connected to the positive pole 122 and the negative pole 121. The layered body is entirely sealed by an insulating sheet 124 with flexibility so that only the positive-pole lead 14 and negative-pole lead 16 are exposed.

In the battery device 10 of this embodiment, a circuit board 20 formed with a protection circuit 18 is provided in contact with a side surface of the layered body. The circuit board 20 is fixed with connection strips 22 and 24 electrically connected to the protection circuit 18. The connection strips 22 and 24 are formed, for example, by nickel thin sheets (strips), and electrically connected to the respective positive-pole lead 14 and negative-pole lead 16.

Further, in the battery device 10 of this embodiment, the connection strips 22 and 24 have partial cuts 221, 222 and 241, 242. These partial cuts 221, 222 and 241, 242 constitute a length varying means which allows variation in the connection length. Here, the connection length refers to a length of the connection strip 22 that extends between the circuit board 20 and the positive-pole lead 14, or a length of the connection strip 24 between the positive-pole lead 16 and the circuit board 20, wherein these connection strips 22 and 24 are laid, without looseness, on along an outer shape of the layered body, or the lithium ion battery 12.

Figure 5:
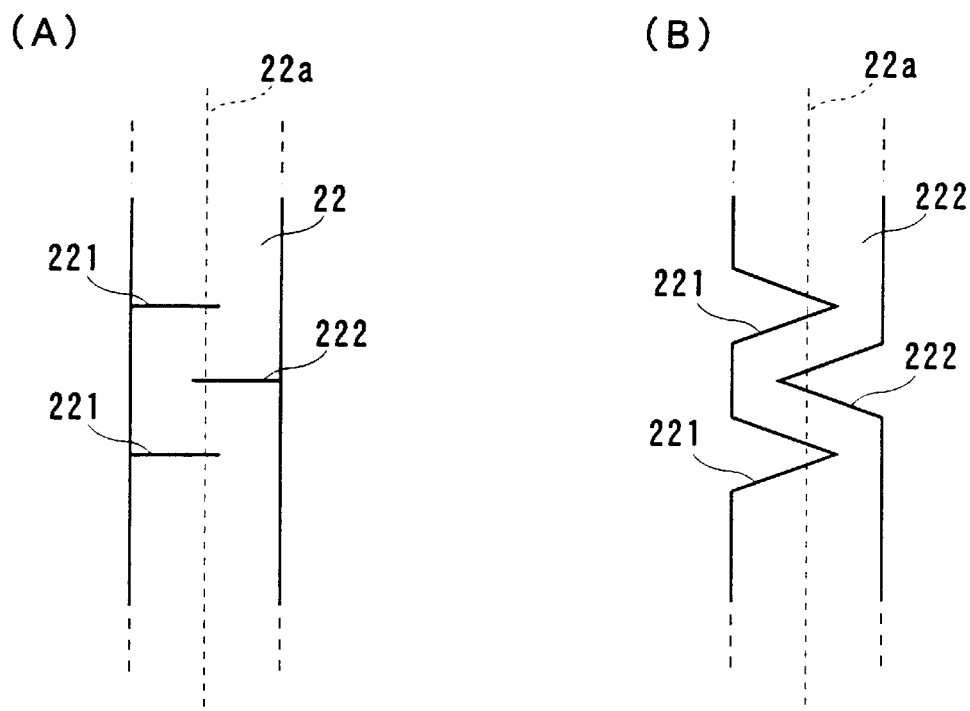
FIG. 5 is a plan view showing one example of a connection strip of the FIG. 2 embodiment.

FIG. 5 is a plan view showing part of the connection strip 22 in this embodiment, wherein it should be noted that the other one of the connection strips may be structured in the similar manner.

As shown in FIG. 5(A), a plurality of partial cuts 121 are formed in a direction transverse a lengthwise direction of the connection strip 22, that is, they are formed in plurality of number extending in a width direction. The partial cut 221 at one widthwise side portion of the connection strip 22 extends from one end edge of the connection strip 22 to a point beyond a center line 22a of the connection strip 22, while the partial cut 222 in the other widthwise side portion extends from the other end edge to a point beyond the center line 22a of the connection strip 22. That is, these partial cuts 221 and 222 are alternately formed from the respective end edges of the connection strip 22 to points beyond the center line 22a.

If there is an increase in the connection length between the positive-pole lead 14 and the circuit board 20 of the battery 12 due to expansion in the layered body (lithium ion battery 12) or the like, the partial cuts 221 and 222 are allowed to open lengthening the connection strip 22 in the lengthwise direction. That is, the partial cuts 221 and 222 are opened and closed depending upon the change of the connection length. This allows the length of the connection strip 22 to be varied in the lengthwise direction, thereby absorbing an corresponding variation amount in the connection length.

In this case, it is possible to determine a length variation in the lengthwise direction of the connection strip 22 by determining how long the above-stated partial cuts 221 and 222 are formed to a point beyond the center line 22a of the connection strip 22. The lengthwise length variation can also be increased by increasing the number of the partial cuts 221 and 222.

Although in the FIG. 2 embodiment the partial cuts 221, 222 and 241 and 242 were provided in the respective connection strips 22 and 24, these cuts may be formed in only one connection strip.

Figure 6:
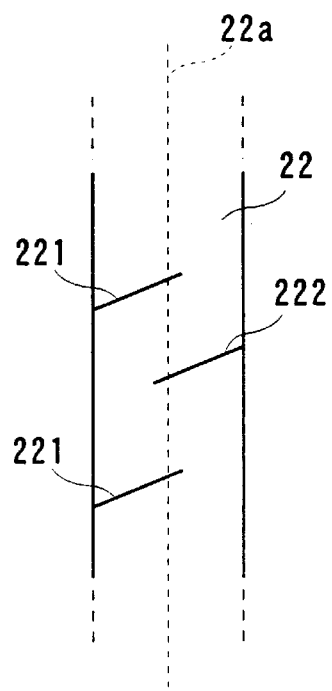
FIG. 6 is a plan view showing another example of the connection strip of the FIG. 2 embodiment.
Figure 7:
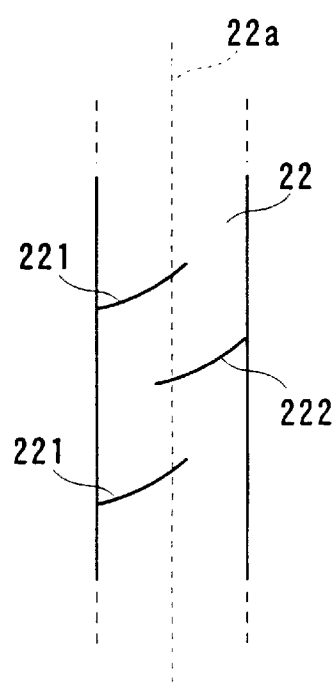
FIG. 7 is a plan view showing still another example of the connection strip of the FIG. 2 embodiment.

Further, as shown in FIG. 6 and FIG. 7 the partial cuts 221 and 222 may be formed to extend obliquely relative to the lengthwise direction (and the width direction) of the connection strip 22, or formed in a curved shape. That is, the partial cuts 221, 222 and 241, 242 may be in any form provided that they are formed extending continuously from the respective end edges to a point beyond the center line of the connection strips 22 and 24. Accordingly, it is possible to provide them in a cut-out form in place of partial cuts. Where employing cut-outs, their forms may be arbitrary provided that the cut-outs are formed to a point beyond the center line of the connection strip 22, 24.

Further, the partial cuts or cut-outs may be formed in a reshaping process after once forming connection strips 22 and 24, or formed simultaneous with the formation of the connection strips 22 and 24.

Figure 8:
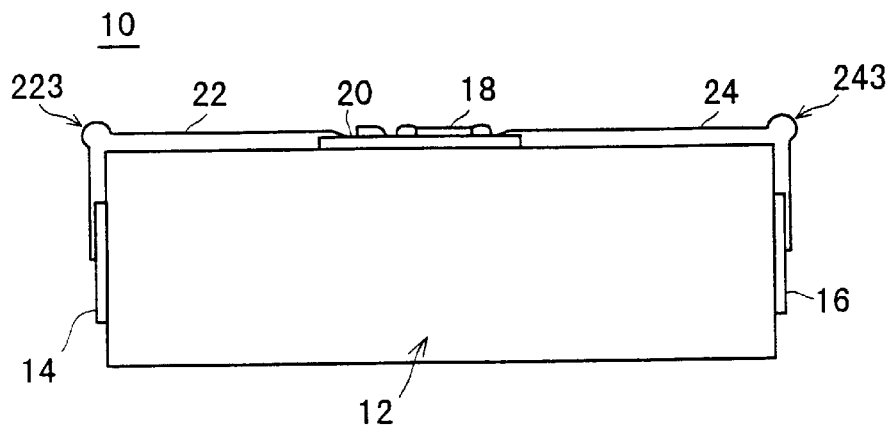
FIG. 8 is an illustrative view showing a battery structure according to another embodiment of the present invention.
Figure 9:
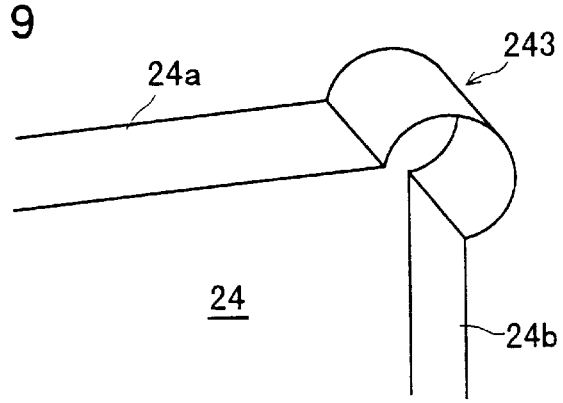
FIG. 9 is an illustrative view showing a bend portion of the FIG. 8 embodiment.

FIG. 8 is an illustrative view of a battery structure as viewed from a side, showing another embodiment of the present invention. In also this embodiment, connection strips 22 and 24 are provided extending along an outer shape of the battery 12, or the layered body, to connect between the circuit board 20 and the positive-pole lead 14 or negative-pole lead 16. The connection strips 22 and 24 are respectively formed with curved portions 223 and 243. One connection strip 24, representative of these two connection strips 22 and 24, is illustrated in FIG. 9. This connection strip 24 includes a first portion 24a extending along a side surface of the battery 12 and a second portion 24b along a back surface of the battery 12, wherein the curved portion 243 is formed connecting between the first portion 24a and the second portion 24b. The curved portion 243 is formed such that one part in the connection strip 24 projects at its entire width in one direction (outwardly) to form a bend portion.

If the connection length between the positive-pole lead 14 or negative-pole lead 16 and the circuit board 20 of the battery 12 is increased by expansion of the layered body or the like, the connection strips 22 and 24 experience tensions in the lengthwise direction. Thereupon the curved portions 223 and 243 are allowed to expand in the lengthwise direction, increasing the length of the connection strips 22, 24 corresponding to the increase in the connection length.

To fix the connection strips 22 and 24 onto the outer surface of the battery 12, there is a necessity to bend them in a manner extending along the outer shape of the battery 12. The curved portions 223 and 243, if previously formed at the bend portions of the connection strips 22 and 24 as shown in FIG. 8 and FIG. 9, facilitate the strips to be bent extending along the outer surface of the battery 12.

Figure 10:
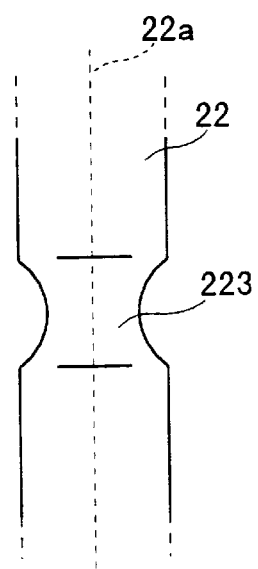
FIG. 10 is a plan view showing another example of a connection strip of the FIG. 9 embodiment.

Further, if a width-reduced part is provided, for example, to a portion to be formed into a curved portion 223 in the connection strip 22 as shown in FIG. 10, the width-narrowed portion has a decreased strength. Accordingly, the curved portion 223 is readily expanded when a tensile force is applied to the connection strip 22. This reduces loads imparted to other portions than the curved portion 223 of the connection strip 22. Although in the FIG. 10 embodiment the width was narrowed at the curved portion 223, it is also possible to reduce the strength of the curved portion 223 (243) by reducing the thickness at the curved portion 223 (243) of the connection strip 22 (24). This also makes the curved portion 223 (243) be deformed.

In this manner, all the above embodiments can absorb variation in the connection length between the circuit board 20 and the positive-pole lead 14 or the negative-pole lead 16 if partial cuts or cut-outs or curved portions are formed expandable or deformable in at least one of the connection strips 22 and 24. It is therefore possible to relax stresses caused due to the expansion and contraction of the battery 12 (layered body).

Figure 11:
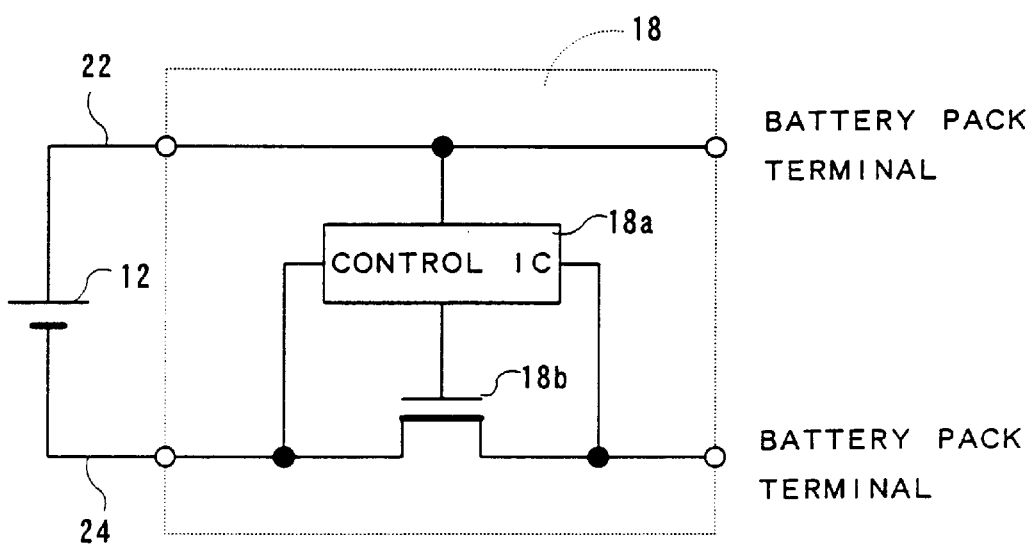
FIG. 11 is a block diagram showing one example of a protection circuit.

Incidentally, the battery device 10 as embodied has a circuit configuration as shown in FIG. 11. That is, this battery device 10 has a function to supply power from the lithium ion battery 12 to a battery-driven device (not shown) through a battery pack terminals. The positive pole and the negative pole of the lithium ion battery 12 are connected to the circuit board via the connection strips 22 and 24. The circuit board is formed thereon with a protection circuit 18 including a control IC 18a, such as "BA3153FV" made by Rohm Co., Ltd. and a switch 18b. The control IC 18a monitors voltage and/or current of the lithium ion battery 12. During discharge, the control IC turns off the switch 18b depending upon the voltage/current when there is an over-current flowing or a voltage drop below a given value. Due to this, the power supply through the battery pack terminals is shut off. Also, the control IC 18a, during electricity charging, turns off the switch 18b based on the voltage/current when an over-current flows or the voltage is increased above a given value. Therefore, the supply of charging power through the battery pack terminal to the lithium ion battery 12 is shut off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A battery device, comprising:
    a lithium ion battery having a positive pole and a negative pole formed of a polymer material to effect electricity charge and discharge due to lithium ions;
    a circuit board arranged on an outer surface of said lithium ion battery;
    a first connection member which connects between said circuit board and said positive pole;
    a second connection member which connects between said circuit board and said negative pole; and
    a length varying means provided in association with at least one of said first connection member and said second connection member to vary at least one of a first connection length between said circuit board and said positive pole and a second connection length between said circuit board and said negative pole.

2. A battery device according to claim 1, wherein said length varying means includes an expandable/contractible portion formed in at least one of said first connection member and said second connection member.

3. A battery device according to claim 2, wherein said expandable/contractible portion includes a readily deformable portion.

4. A battery device according to claim 3, wherein at least one of said first connection member and said second connection member is a strip member with a predetermined width, and said readily deformable portion including a plurality of partial cuts each formed extending in a width direction from a lateral end of said strip member.

5. A battery device according to claim 4, wherein said plurality of partial cuts extend from said lateral end to a point beyond a widthwise center of said strip member.

6. A battery device according to claim 4, wherein said plurality of partial cuts includes first partial cuts and second partial cuts respectively formed in side portions of said strip member.

7. A battery device according to claim 6, wherein said first partial cuts and said second partial cuts are alternately formed with respect to a lengthwise direction of said strip member.

8. A battery device according to claim 3, wherein said deformable portion includes a curved portion formed in at least one of said first connection member and said second connection member.

9. A battery device according to claim 8, wherein at least one of said first connection member and said second connection member includes a bend portion at which bending is given in a manner extending along an outer surface of said lithium ion battery, and said curved portion being formed at said bend portion.

10. A battery device according to claim 5, wherein said plurality of partial cuts includes first partial cuts and second partial cuts respectively formed in side portions of said strip member.

* * * * *